US008014536B2

(12) United States Patent
Attias

(10) Patent No.: US 8,014,536 B2
(45) Date of Patent: Sep. 6, 2011

(54) AUDIO SOURCE SEPARATION BASED ON FLEXIBLE PRE-TRAINED PROBABILISTIC SOURCE MODELS

(75) Inventor: Hagai Thomas Attias, San Francisco, CA (US)

(73) Assignee: Golden Metallic, Inc., San Francisco, CA (US)

( * ) Notice: Subject to any disclaimer, the term of this patent is extended or adjusted under 35 U.S.C. 154(b) by 1313 days.

(21) Appl. No.: 11/607,473

(22) Filed: Dec. 1, 2006

(65) Prior Publication Data

US 2007/0154033 A1 Jul. 5, 2007

Related U.S. Application Data

(60) Provisional application No. 60/741,604, filed on Dec. 2, 2005.

(51) Int. Cl.
*H04R 29/00* (2006.01)
*H04B 3/00* (2006.01)
*G10L 15/00* (2006.01)

(52) U.S. Cl. ............ 381/56; 381/77; 704/240; 704/242

(58) Field of Classification Search .................... 704/10, 704/201, 220, 240, 241, 242; 381/56, 77
See application file for complete search history.

(56) References Cited

U.S. PATENT DOCUMENTS 5,208,786 A 5/1993 Weinstein et al.
5,694,474 A 12/1997 Ngo et al.
6,023,514 A 2/2000 Strandberg
6,182,018 B1 1/2001 Tran et al.
6,317,703 B1 11/2001 Linsker
6,978,159 B2 12/2005 Feng et al.
7,088,831 B2 8/2006 Rosca et al.
2005/0195990 A1 9/2005 Kondo et al.

OTHER PUBLICATIONS

AJ Bell, TJ Sejnowski. An Information maximization approach to blind separation and blind deconvolution, (1995). Neural Computation 7, pp. 1129-1159.

TW Lee, AJ Bell, R. Lambert. Blind Separation of convolved and delayed sources, (1997). Advances in Neural Information Processing Systems 9, pp. 758-764.

JF Cardoso. Informax and maximum likelihood source separation, (1997). IEEE Signal Processing Letters 4, pp. 112-114.

H Attias, CE Shreiner. Blind source separation and deconvolution: the dynamic component analysis algorithm, (1998). Neural Computation 10, pp. 1373-1424.

H Attias. Independent Factor Analysis, (1999). Neural Computation 11, pp. 803-851.

(Continued)

*Primary Examiner* — Devona E Faulk
*Assistant Examiner* — Douglas J Suthers
(74) *Attorney, Agent, or Firm* — Lumen Patent Firm

(57) ABSTRACT

Improved audio source separation is provided by providing an audio dictionary for each source to be separated. Thus the invention can be regarded as providing "partially blind" source separation as opposed to the more commonly considered "blind" source separation problem, where no prior information about the sources is given. The audio dictionaries are probabilistic source models, and can be derived from training data from the sources to be separated, or from similar sources. Thus a library of audio dictionaries can be developed to aid in source separation. An unmixing and deconvolutive transformation can be inferred by maximum likelihood (ML) given the received signals and the selected audio dictionaries as input to the ML calculation. Optionally, frequency-domain filtering of the separated signal estimates can be performed prior to reconstructing the time-domain separated signal estimates. Such filtering can be regarded as providing an "audio skin" for a recovered signal.

12 Claims, 5 Drawing Sheets

OTHER PUBLICATIONS

A Acero, S Altschuler, L WU. Speech/noise separation using two microphones and a VQ model of speech signals, (2000). Proceedings of the 2000 International Conference on Spoken Language Processing, pp. 4 532-535.

L Parra, C Spence. Convolutive blind source separation of non-stationary sources, (2000). IEEE Trans. on Speech and Audio Processing 8, pp. 320-327.

H Attias. New EM algorithms for source separation and deconvolution, (2003). Processings of the IEEE 2003 International Conference on Acoustics, Speech and Signal Processing.

AUDIO SOURCE SEPARATION BASED ON FLEXIBLE PRE-TRAINED PROBABILISTIC SOURCE MODELS

CROSS REFERENCE TO RELATED APPLICATIONS

This application claims the benefit of U.S. provisional application 60/741,604, filed on Dec. 2, 2005, entitled "Audio Signal Separation in Data from Multiple Microphones", and hereby incorporated by reference in its entirety.

FIELD OF THE INVENTION

This invention relates to signal processing for audio source separation.

BACKGROUND

In many situations, it is desirable to selectively listen to one of several audio sources that are interfering with each other. This source separation problem is often referred to as the "cocktail party problem", since it can arise in that context for people having conversations in the presence of interfering talk. In signal processing, the source separation problem is often formulated as a problem of deriving an optimal estimate (e.g., a maximum likelihood estimate) of the original source signals given the received signals exhibiting interference. Multiple receivers are typically employed.

Although the theoretical framework of maximum likelihood (ML) estimation is well known, direct application of ML estimation to the general audio source separation problem typically encounters insuperable computational difficulties. In particular, reverberations typical of acoustic environments result in convolutive mixing of the interfering audio signals, as opposed to the significantly simpler case of instantaneous mixing. Accordingly, much work in the art has focused on simplifying the mathematical ML model (e.g., by making various approximations and/or simplifications) in order to obtain a computationally tractable ML optimization. Although such an ML approach is typically not optimal when the relevant simplifying assumptions do not hold, the resulting practical performance may be sufficient. Accordingly, various simplified ML approaches have been investigated in the art.

For example, instantaneous mixing is considered in articles by Cardoso (IEEE Signal Processing Letters, v4, pp 112-114, 1997), and by Bell and Sejnowski (Neural Computation, v7, pp 1129-1159, 1995). Instantaneous mixing is also considered by Attias (Neural Computation, v11, pp 803-851, 1999), in connection with a more general source model than in the Cardoso or Bell articles.

A white (i.e., frequency independent) source model for convolutive mixing is considered by Lee et al. (Advances in Neural Information Processing Systems, v9, pp 758-764), and a filtered white source model for convolutive mixing is considered by Attias and Schreiner (Neural Computation, v10, pp 1373-1424, 1998). Convolutive mixing for more general source models is considered by Acero et al (Proc. Intl. Conf. on Spoken Language Processing, v4, pp 532-535, 2000), by Parra and Spence (IEEE Trans. on Speech and Audio Processing, v8, pp 320-327, 2000), and by Attias (Proc. IEEE Intl. Conf. on Acoustics, Speech and Signal Processing, 2003).

Various other source separation techniques have also been proposed. In U.S. Pat. No. 5,208,786, source separation based on requiring a near-zero cross-correlation between reconstructed signals is considered. In U.S. Pat. Nos. 5,694,474, 6,023,514, 6,978,159, and 7,088,831, estimates of the relative propagation delay between each source and each detector are employed to aid source separation. Source separation via wavelet analysis is considered in U.S. Pat. No. 6,182,018. Analysis of the pitch of a source signal to aid source separation is considered in U.S. 2005/0195990.

Conventional source separation approaches (both ML methods and non-ML methods) have not provided a complete solution to the source separation problem to date. Approaches which are computationally tractable tend to provide inadequate separation performance. Approaches which can provide good separation performance tend to be computationally intractable. Accordingly, it would be an advance in the art to provide audio source separation having an improved combination of separation performance and computational tractability.

SUMMARY

Improved audio source separation according to principles of the invention is provided by providing an audio dictionary for each source to be separated. Thus the invention can be regarded as providing "partially blind" source separation as opposed to the more commonly considered "blind" source separation problem, where no prior information about the sources is given. The audio dictionaries are probabilistic source models, and can be derived from training data from the sources to be separated, or from similar sources. Thus a library of audio dictionaries can be developed to aid in source separation. An unmixing and deconvolutive transformation can be inferred by maximum likelihood (ML) given the received signals and the selected audio dictionaries as input to the ML calculation. Optionally, frequency-domain filtering of the separated signal estimates can be performed prior to reconstructing the time-domain separated signal estimates. Such filtering can be regarded as providing an "audio skin" for a recovered signal.

DETAILED DESCRIPTION

Part of this description is a detailed mathematical development of an embodiment of the invention, referred to as "Audiosieve". Accordingly, certain aspects of the invention will be described first, making reference to the following detailed example as needed.

Figure 1:
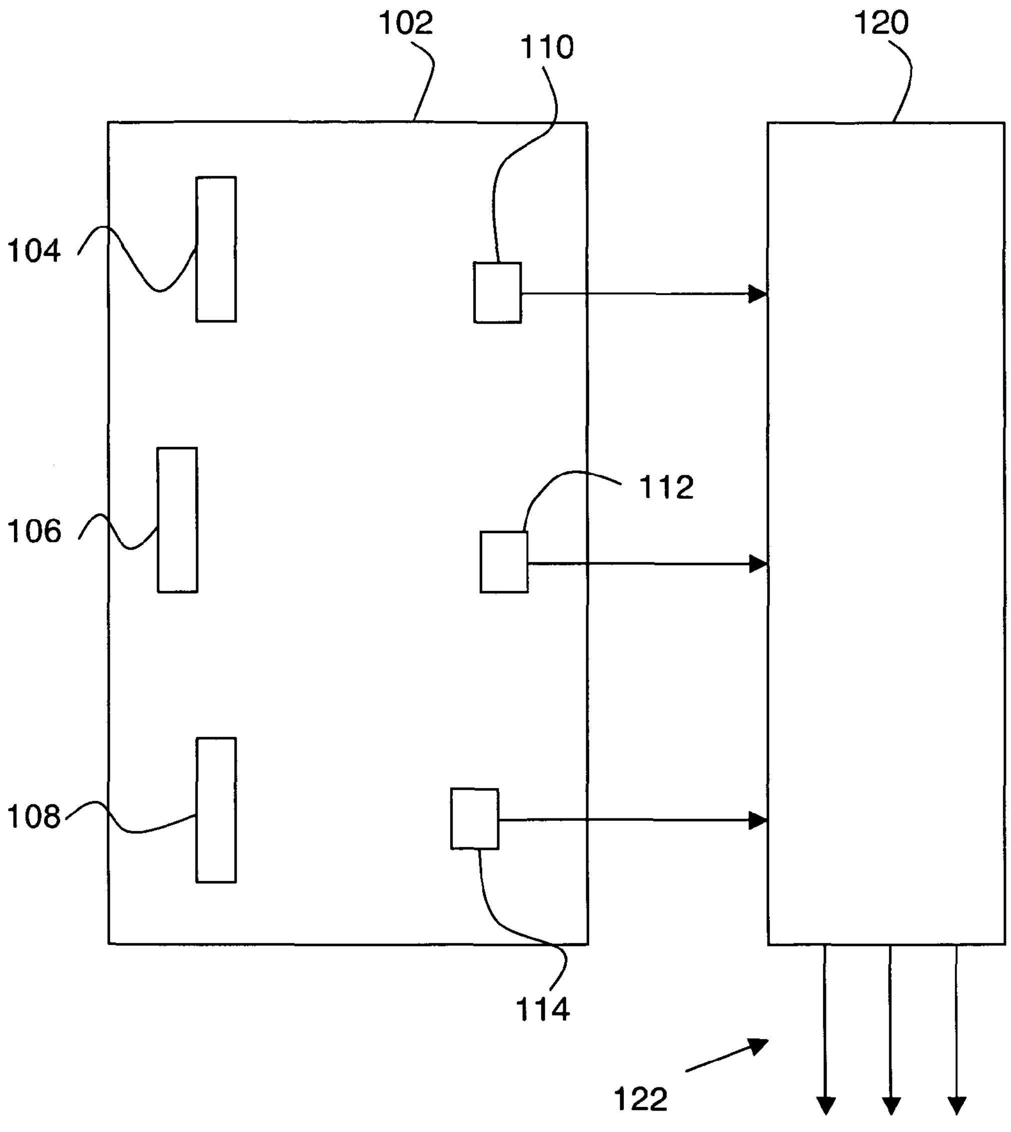
FIG. 1 shows an audio source separation system according to an embodiment of the invention.

FIG. 1 shows an audio source separation system according to an embodiment of the invention. Multiple audio sources (sources 104, 106, and 108) and multiple audio detectors (detectors 110, 112, and 114) are disposed in a common acoustic environment 102. Each detector provides a sensor signal which is a convolutive mixture of the source signals emitted from the sources. Although the example of FIG. 1 shows three sources and three detectors, the invention can be practiced with L sources and L detectors, where L is greater than one.

The sensor signals from detectors 110, 112 and 114 are received by a processor 120, which provides separated signal estimates 122. Processor 120 can be any combination of hardware and/or software for performing the source separation method of FIG. 2.

Figure 2:
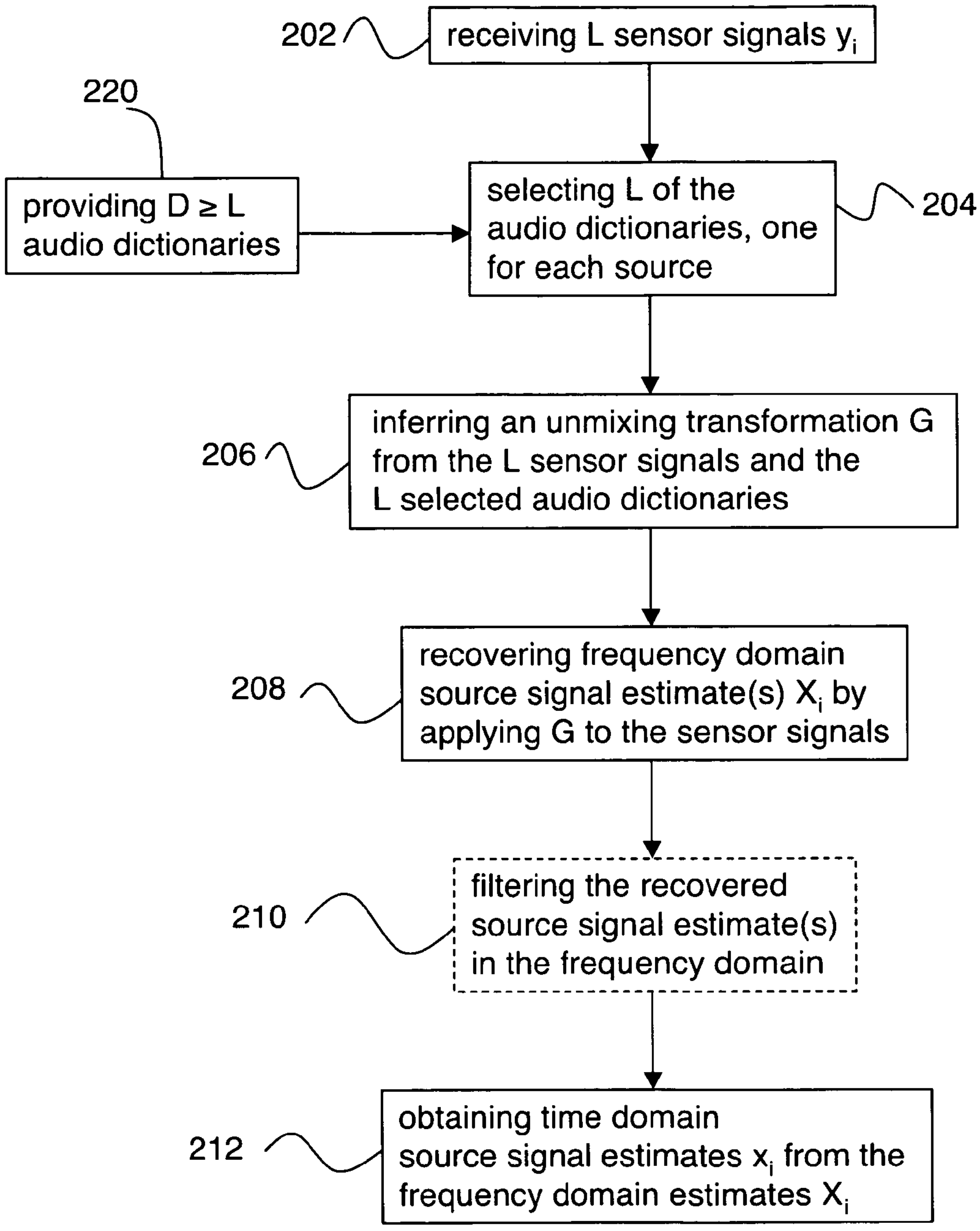
FIG. 2 shows an audio source separation method according to an embodiment of the invention.

FIG. 2 shows an audio source separation method according to an embodiment of the invention. Step 202 is receiving L sensor signals $y_i$, where each sensor signal is a convolutive mixture of the L source signals $x_i$. Step 220 of providing the library of D≧L audio dictionaries is described in greater detail below, since the dictionary library is an input to the source separation algorithm of FIG. 2. Each audio dictionary is a probabilistic source model that is a sum of one or more source model components, each source model component having a prior probability and a component probability distribution having one or more frequency components. In the following detailed example, Eqs. 6-8 show the source model, where $\pi_{is}$ are the prior probabilities, and the probability distributions are products of single-variable normal distributions. In this example, an audio dictionary is a set of parameters $\theta_i$ as in Eq. 8.

Typically, the component probability distributions of the audio dictionary are taken to be products of single variable probability distributions, each having the same functional form (i.e., the frequency components are assumed to be statistically independent). Although the invention can be practiced with any functional form for the single variable probability distributions, preferred functional forms include Gaussian distributions, and non-Gaussian distributions constructed from Gaussian distributions conditioned on appropriate hidden variables with arbitrary distributions. For example, the precision (inverse variance) of a Gaussian distribution can be modeled as a random variable having a lognormal distribution.

Step 204 is selecting L audio dictionaries from the predetermined library of D≧L audio dictionaries, one dictionary for each source. Selection of the audio dictionaries can be manual or automatic. For example, if it is desired to separate a spoken speech signal from a musical instrument signal, an audio dictionary for spoken speech and an audio dictionary for a musical instrument can be manually selected by the user. Audio dictionary libraries can be constructed to have varying levels of detail. Continuing the preceding example, the library could have only one spoken speech dictionary (e.g., a typical speaker), or it could have several (e.g., speaker is male/female, adult/child, etc.). Similarly, the library could have several musical instrument dictionaries (e.g., corresponding to various types of instrument, such as violin, piano, etc.). An audio dictionary can be constructed for a set of different human speakers, in which case the source model corresponding to that dictionary would be trained on sound data from all speakers in the set. Similarly, a single audio dictionary can be for a set of different musical instruments. Automatic selection of audio dictionaries can be performed by maximizing the likelihood of the received signals with respect to all dictionary selections. Hence the dictionaries serve as modules to plug into the source separation method. Selecting dictionaries matched to the sounds that occur in a given scenario can improve separation performance.

Figure 4:
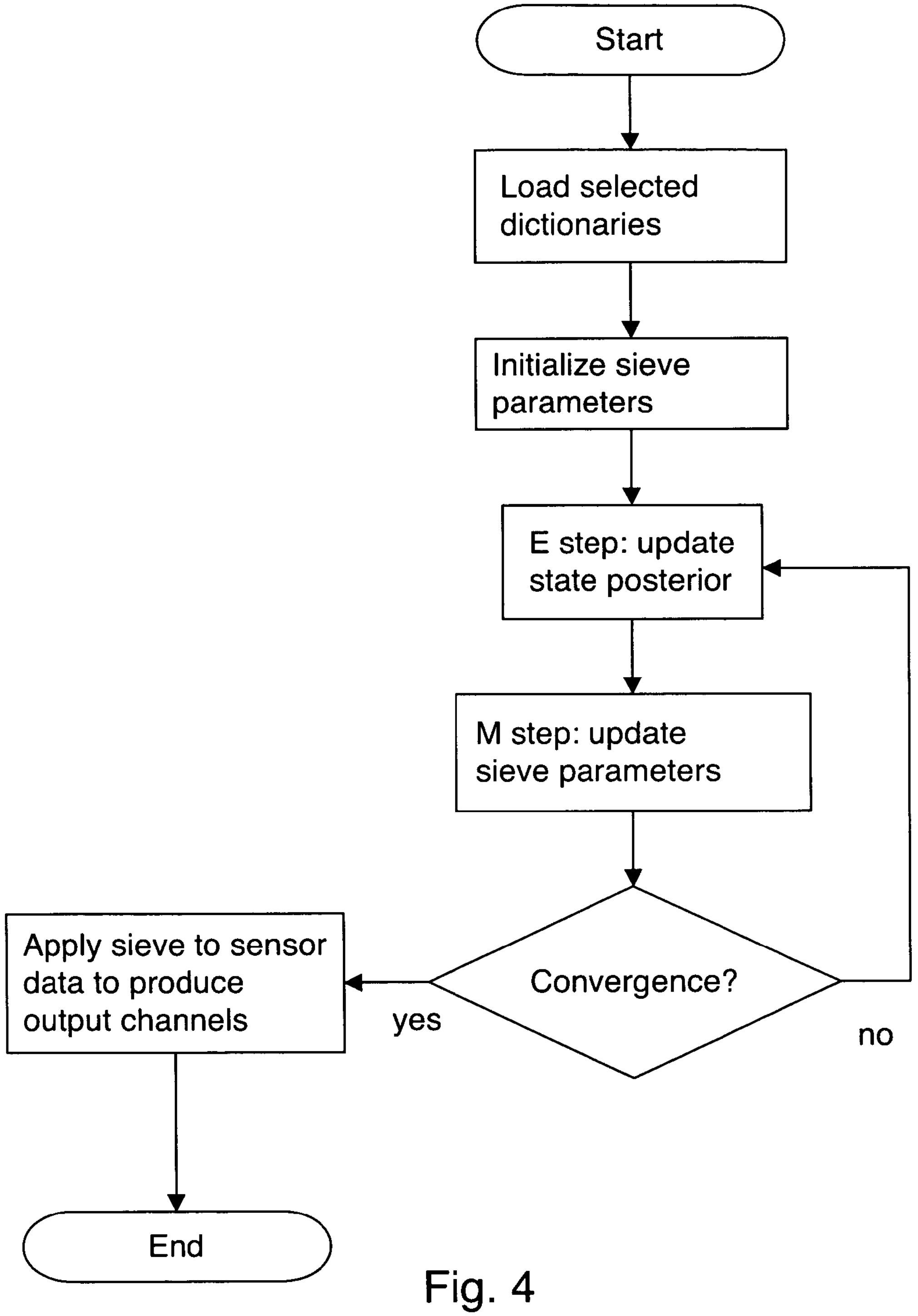
FIG. 4 is a flowchart for performing audio source separation in accordance with an embodiment of the invention.

Step 206 is inferring an unmixing and deconvolutive transformation G from the L sensor signals and the L selected audio dictionaries by maximizing a likelihood of observing the L sensor signals. This ML algorithm is an EM (expectation maximization) method, where E steps and M steps are alternatingly performed until convergence is reached. FIG. 4 is a flowchart of this method, and Eqs. 18-29 of the detailed example relate to inferring G. For the special case L=2, the M-step can be performed analytically, as described in Eqs. 30-35 of the example.

Step 208 is recovering one or more frequency domain source signal estimates $X_i$ by applying G to the received sensor signals. Since G is a linear transformation, standard signal processing methods are applicable for this step.

Optional step 210 is filtering the recovered source signal estimate(s) in the frequency domain. Such filtering can be regarded as providing an "audio skin" to suit the user's preference. Such audio skins can be selected from a predetermined library of audio skins. Eq. 36 of the detailed example relates to audio skins.

Step 212 is obtaining time-domain source signal estimate $x_i$ from the frequency domain estimates $X_i$. Standard signal processing methods (e.g., FFT) are applicable for this step.

Figure 3:
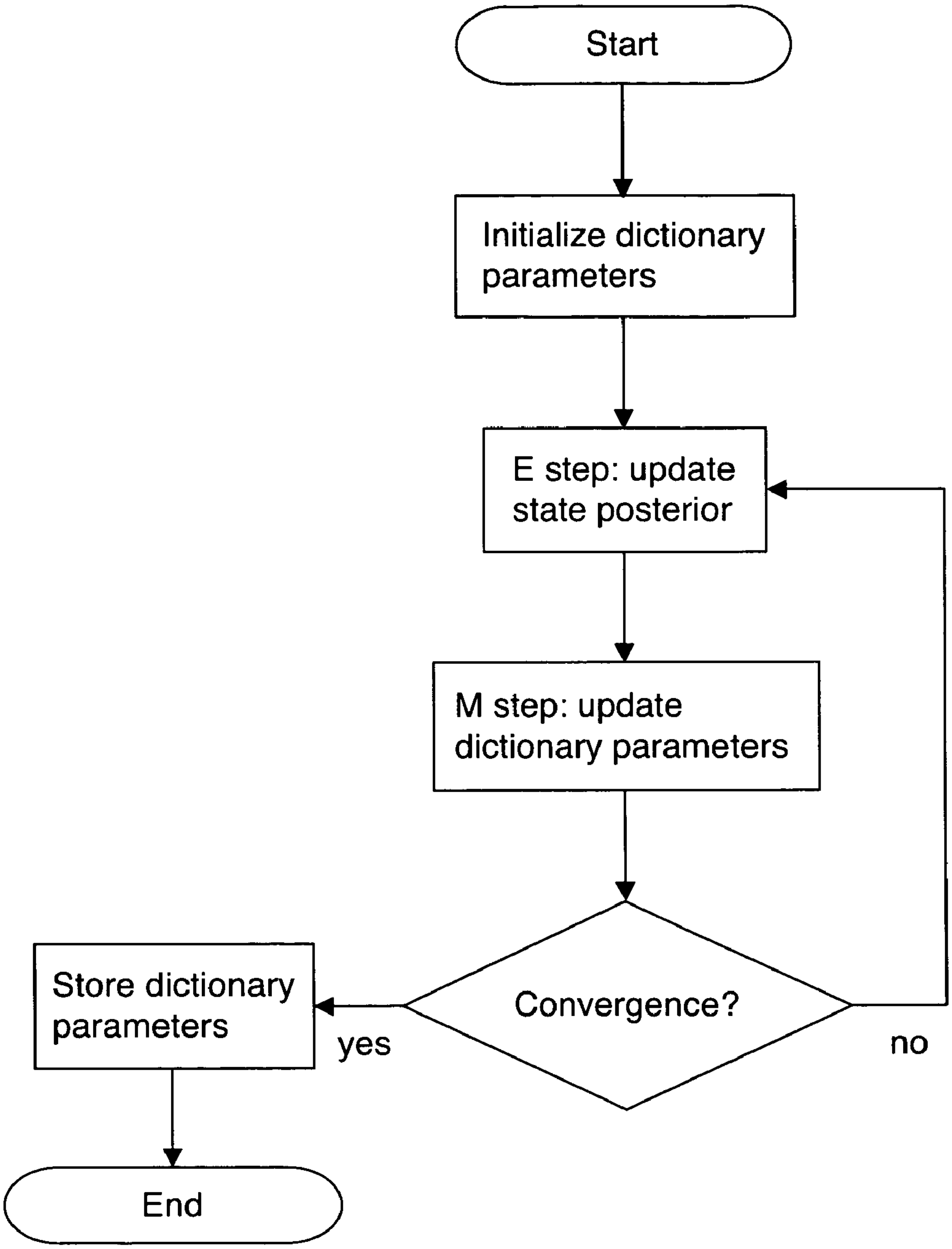
FIG. 3 is a flowchart for generating audio dictionaries for use in embodiments of the invention.

Step 220 of providing the library of audio dictionaries is based on the use of training data from sources similar (or the same) as the sources to be separated. FIG. 3 is a flowchart of a method for deriving an audio dictionary from training data. Eqs. 9-17 of the detailed example relate in more detail to this method, which is also an expectation maximization ML algorithm. Training data is received from an audio source. The prior probabilities and parameters (e.g., precisions) of the probability distributions are selected to maximize a likelihood of observing the training data. By following the algorithm of FIG. 3 for various sources separately, a library of audio dictionaries can be built up, from which specific dictionaries can be selected that are appropriate for the source separation problem at hand.

Figure 5:
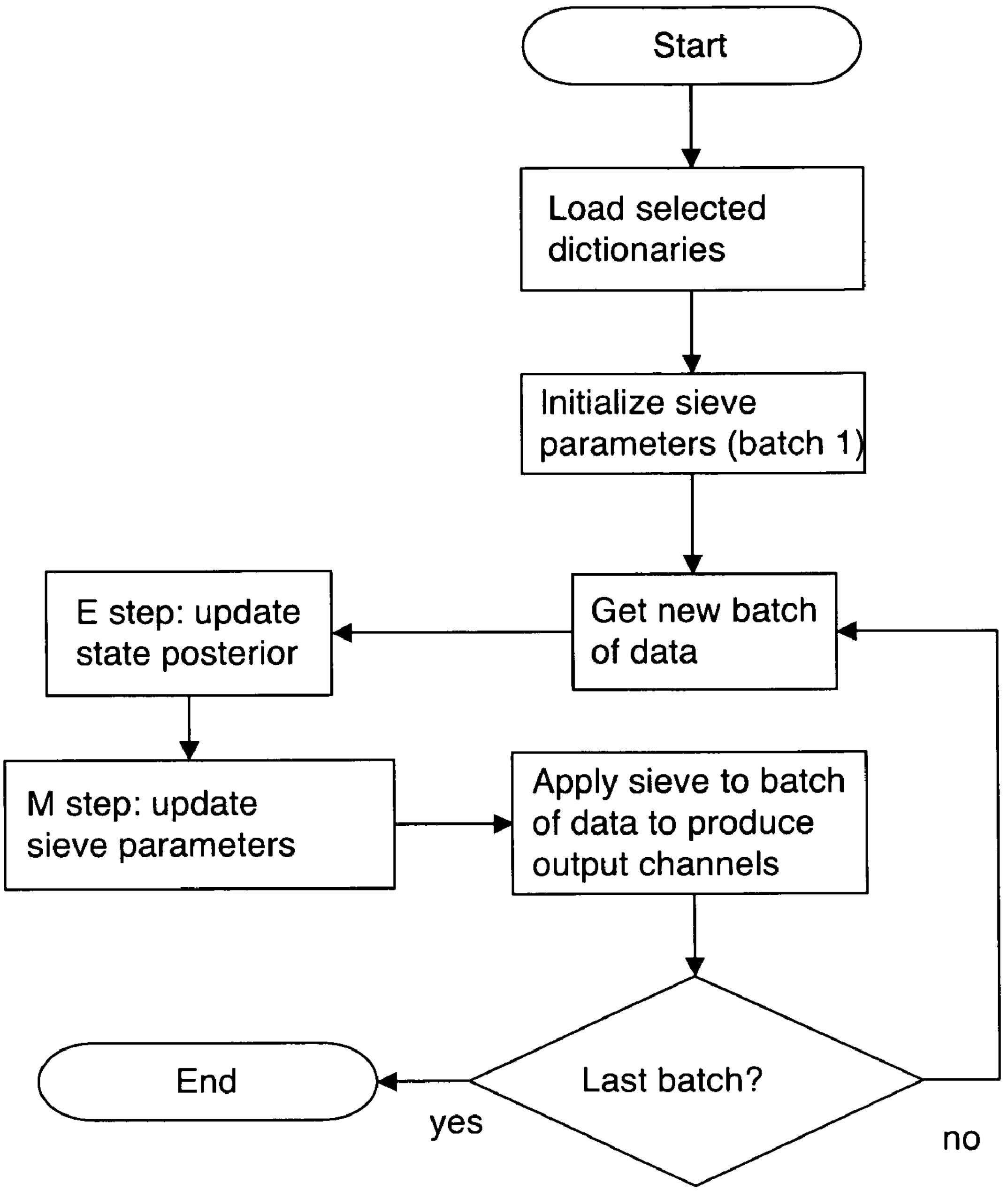
FIG. 5 is a flowchart for performing sequential audio source separation in accordance with an embodiment of the invention.

Source separation according to the invention can be performed as a batch mode calculation based on processing the entire duration of the received sensor signals. Alternatively, inferring the unmixing G can be performed as a sequential calculation based on incrementally processing the sensor signals as they are received (e.g., in batches of less than the total signal duration). FIG. 5 is a flowchart for a sequential separation method. Sequential separation is considered in connection with Eq. 37 of the detailed example.

Problem Formulation

This example focuses on the scenario where the number of sources of interest equals the number of sensors, and the background noise is vanishingly small. This condition is known by the technical term 'square, zero-noise convolutive mixing'. Whereas Audiosieve may produce satisfactory results under other conditions, its performance would in general be suboptimal.

Let L denote the number of sensors, and let $Y_{in}$ denote the signal waveform captured by sensor i at time n=0, 1, 2, . . . , where i=1: L. Let $x_{in}$ denote the signal emitted by source i at time n. Then $Y_{in}=\Sigma_{jm}H_{ijm}x_{jn-m}$. The filters $H_{ijm}$ model the convolutive mixing transformation.

To achieve selective signal cancellation, Audiosieve must infer the individual source signals $x_{in}$, which are unobserved, from the sensor signals. Those signals can play in the output channel of Audiosieve. By choosing a particular channel, a user can then select the signals they choose to ignore, and hear only the signal they want to focus on. For this purpose we seek an unmixing transformation $G_{ijm}$ such that $x_{in}=\Sigma_{jm}G_{ijm}Y_{jn-m}$, or in vector notation $$x_n = \sum_m G_m y_{n-m}, \tag{1}$$

where $x_n$, $Y_n$ are L×1 vectors and $G_m$ is a L×L matrix.

Frames

Rather than working with signal waveforms in the time domain as in (1), it turns out to be more computationally efficient, as well as mathematically convenient, to work with signal frames in the frequency domain. Frames are obtained by applying windowed DFT to the waveform.

Let $X_{im}[k]$ denote the frames of source i. They are computed by multiplying the waveform $x_{in}$ by an N-point window $w_n$ at J-point shifts, $$X_{im}[k] = \sum_{n=0}^{N-1} e^{-i\omega_k n} w_n x_{i,Jm+n}, \tag{2}$$

where m=0 : M−1 is the frame index and k=0 : N−1 is the frequency index. The number of frames M is determined by the waveform's length and the window shift. The sensor frames $Y_{im}[k]$ are computed from $y_{in}$, in the same manner.

In the frequency domain, the task is to infer from sensor data an unmixing transformation $G_{ij}[k]$ for each frequency k, such that $X_{im}[k]=\Sigma_j G_{ij}[k]Y_{jm}[k]$. In vector notation we have $$X_m[k]=G[k]Y_m[k], \tag{3}$$

where $X_m[k]$, $Y_m[k]$ are complex L×1 vectors and G[k] is a complex L×L matrix. Once Audiosieve infers the source frames from the sensor frames via (3), their time domain wave-forms $x_n$ can be synthesized by an overlap-and-add procedure, as long as J is smaller than the effective window size (i.e., the non-zero $w_n$s).

Some Notation

We often use a collective notation obtained by dropping the frequency index k from the frames. $X_{im}$ denotes the set of $X_{im}[k]$ values at all frequencies, and $X_m$ denotes the set of L×1 vectors $X_m[k]$ at all frequencies.

We define a Gaussian distribution with mean μ and precision ν (defined as the inverse variance) over a real variable z by $$N(z|\mu, \nu) = \sqrt{\frac{\nu}{2\pi}}\, e^{-\frac{\nu}{2}(z-\mu)^2}. \tag{4}$$

We also define a Gaussian distribution with parameters μ, ν over a complex variable Z by $$N(Z|\mu, \nu) = \frac{\nu}{\pi} e^{-\nu|Z-\mu|^2}, \tag{5}$$

where μ is complex and ν is real and positive. Two moments are $EZ=\mu$ and $E|Z|^2=1/\nu$, hence μ is termed the mean of Z and ν is termed the precision. This is a joint distribution over the real and imaginary parts of Z. Notice that this is not the most general complex Gaussian distribution, since the real and imaginary parts are uncorrelated and have the same precision.

Audio Dictionary

Audiosieve employs parametric probabilistic models for different types of source signals. The parameter set of the model of a particular source is termed an audio dictionary. This section describes the source model, and presents an algorithm for inferring the audio dictionary for a source from clean sound samples of that source.

Source Signal Model

Audiosieve describes a source signal by a probabilistic mixture model over its frames. The model for source i has $S_i$ components, $$p(X_{im}) = \sum_{s=1}^{S_i} p(X_{im}|S_{im} = s)p(S_{im} = s). \tag{6}$$

Here we assume that the frames are mutually independent, hence $p(X_{i,m=0:M-1})=\Pi_m p(X_{im})$. It is straightforward to relax this assumption and use, e.g., a hidden Markov model.

We model each component by a zero-mean Gaussian factorized over frequencies, where component s has precision $\nu_{is}[k]$ at frequency k, and prior probability $\pi_{is}$, $$p(X_{im}|S_{im} = s) = \prod_{k=0}^{N/2} N(X_{im}[k]|0, \nu_{is}[k]) \tag{7}$$
$$p(S_{im} = s) = \pi_{is}.$$

It is sufficient to consider k=0 : N/2 since $X_{im}[N-k]=X_{im}[k]^*$. Notice that the precisions $\nu_{is}[k]$ form the inverse spectrum of component s, since the spectrum is the second moment $E(|X_{im}[k]|^2|S_{im}=s)=1/\nu_{is}[k]$, and the first moment vanishes.

The inverse-spectra and prior probabilities, collectively denoted by $$\theta_i=\{\nu_{is}[k],\pi_{is}|s=1:S_i,k=0:N/2\}, \tag{8}$$

constitute the audio dictionary of source i.

An Algorithm for Inferring a Dictionary from Data

This section describes a maximum likelihood (ML) algorithm for inferring the model parameters $\theta_i$ for source i from sample data $X_{im}$. A flowchart describing the algorithm is displayed in FIG. 3.

Generally, ML infers parameter values by maximizing the observed data likelihood $\mathcal{L}_i=\Sigma_m \log p(X_{im})$ w.r.t. the parameters. In our case, however, we have a hidden variable model, since not just the parameters $\theta_i$ but also the source states $S_{im}$ are not observed. Hence, in addition to the parameters, the states must also be inferred from the signal frames.

EM is an iterative algorithm for ML in hidden variable models. To derive it we consider the objective function $$F_i(\bar{\pi}_i, \theta_i) = \sum_{m=0}^{M-1}\sum_{s=1}^{S} \bar{\pi}_{ism}[\log p(X_{im}, S_{im} = s) - \log\bar{\pi}_{ism}] \tag{9}$$

which depends on the parameters $\theta_i$, as well as on $\bar{\pi}_i$ which denotes collectively the posterior distribution over the states of source i, $$\bar{\pi}_i=\{\bar{\pi}_{ism}|s=1:S_i,m=0:M-1\} \tag{10}$$

$\bar{\pi}_{ism}$ is the probability that source i is in state $S_{im}=s$ at time m, conditioned on the frame $X_{im}$. Each EM iteration maximizes $F_i$ alternately w.r.t. to the parameters and the posteriors, using an E-step and an M-step.

The E-step maximizes $F_i$ w.r.t. to the state posteriors by the update rule $$\bar{\pi}_{ism} = p(S_{im} = s|X_{im}) = \frac{p(X_{im}, S_{im} = s)}{\sum_{s'=1:S} p(X_{im}, S_{im} = s')}, \quad (11)$$

keeping constant the current values of the parameters (note that the r.h.s. depends on $\theta_i$).

The M-step maximizes $F_i$ w.r.t. the model parameters by the update rule $$v_{is}[k]^{-1} = \frac{\sum_{m=0}^{M-1} \bar{\pi}_{ism}|X_{im}[k]|^2}{\sum_{m=0}^{M-1} \bar{\pi}_{ism}} \quad (12)$$

$$\pi_{is} = \frac{1}{M}\sum_{m=0}^{M-1} \bar{\pi}_{ism},$$

keeping constant the current values of the posteriors. Eqs. (11, 12) define the dictionary inference algorithm.

To prove the convergence of this procedure, we use the fact that $F_i$ is upper bounded by the likelihood, $$F_i(\bar{\pi}_i, \theta_i) \le L_i(\theta_i) = \sum_{m=0}^{M-1} \log p(X_{im}), \quad (13)$$

where equality is obtained when $\bar{\pi}_i$ is set according to (11), with the posterior being computed using $\theta_i$. One may use $F_i$ as a convergence criterion, and stop the EM iteration when the change in $F_i$ is below than a pre-determined threshold. One may also define a convergence criterion using the change in the dictionary parameters in addition to, or instead of, the change in $F_i$.

In typical selective signal cancellation scenarios, Audiosieve uses a DFT length N between a few 100s and a few 1000s, depending on the sampling rate and the mixing complexity. A direct application of the algorithm above would thus be attempting to perform maximization in a parameter space $\theta_i$ of a very high dimension. This could lead to finding a local maximum rather than the global one, and also to overfitting when the data length M is not sufficiently large. Both would result in inferring suboptimal audio dictionaries $\theta_i$, which may degrade Audiosieve's performance.

One way to improve optimization performance is to constrain the algorithm to a low dimensional manifold of the parameter space. We define this manifold using the cepstrum. The cepstrum $\xi_{is}[n]$, n=0 : N−1 is the DFT of the log-spectrum, given by $$\xi_{is}[n] = -\sum_{k=0}^{N-1} e^{-i\omega_n k} \log v_{is}[k] \quad (14)$$

where the DFT is taken w.r.t. k. Notice that $\xi_{is}[n]$ is real, since $v_{is}[k]=v_{is}[N-k]$, and it satisfies the symmetry $\xi_{is}[n]=\xi_{is}[N-n]$.

The idea is to consider $$\log v_{is}[k] = -(1/N)\sum_n \exp(i\omega_n k)\xi_i[n],$$

and keep only the low cepstrum, i.e., choose N' and set $\xi_{is}[n]=0$ for n=N': N/2. Then define the smoothed spectrum by $$\tilde{v}_{is}[k] = \exp\left[-\frac{1}{N}\left(\xi_{is}[0] + 2\sum_{n=0}^{N'-1}\cos(\omega_n k)\xi_{is}[n]\right)\right]. \quad (15)$$

Next, we modify the dictionary inference algorithm by inserting (14,15) following the M-step of each EM iteration, i.e., replacing $v_{is}[k]$ computed by (12) with its smoothed version $\bar{v}_{is}[k]$.

Beyond defining a low dimensional manifold, a suitably chosen N' can also remove the pitch from the spectrum. For speech signals this produces a speaker independent dictionary, which can be quite useful in some situations.

Note that this procedure is an approximation to maximizing F directly w.r.t. the cepstra. To implement exact maximization, one should replace the $v_{is}[k]$ update of (12) by the gradient update rule with a DFT form $$\xi_{is}[n] \to \xi_{is}[n] + \varepsilon\sum_{k=0}^{N} e^{-i\omega_n k}\left(\frac{\tilde{v}_{is}[k]}{v_{is}[k]} - 1\right), \quad n = 0:N' - 1, \quad (16)$$

where $v_{is}[k]$ is given by (12), and $\epsilon$ is a suitably chosen adaptation rate. However, the approximation is quite accurate in practice and is faster than using the gradient rule. It is possible to employ a combination of both: first, run the algorithm using the approximate M-step, then switch to the exact M-step to finalize the dictionary.

The initial values for the parameters $\theta_i$, required to start the EM iteration, are obtained by performing vector quantization (VQ) on the low cepstra of the data $$\xi_i[n] = \sum_{k=0}^{N-1} e^{-i\omega_n k} \log|X_{im}[k]|^2, \quad n = 0:N - 1. \quad (17)$$

Then $\xi_{is}[n]$ is set to the mean of the sth VQ cluster and $\pi_{is}$ to the relative number of data points it contains. One may also use clustering algorithms other than VQ for initialization.

FIG. 3 shows a summary of the algorithm for inferring an audio dictionary from a source's sound data. It begins by initializing the low cepstrals $\xi_i[n]$ (17) and state probabilities $\pi_{is}$ by running VQ on the data, then computes the initial values of the precisions $v_{is}[k]$ using (15). Next comes the EM iteration, where the Estep updates the state posteriors $\bar{\pi}_{ism}$ using (11), and the M-step updates the dictionary parameters $\theta_i$ using (12), then performs smoothing by replacing $v_{is}[k] \to \bar{v}_{is}[k]$ according to (15). The iteration terminates when a convergence criterion is satisfied. The algorithm then stores the dictionary parameters it has inferred in the library of audio dictionaries.

Sieve Inference Engine

This section presents an EM algorithm for inferring the unmixing transformation G[k] from sensor frames $Y_m[k]$. It assumes that audio dictionaries $\theta_i$ for all sources i=1 : L are given. A flowchart describing the algorithm is displayed in FIG. 4.

Sensor Signal Model

Since the source frames and the sensor frames are related by (3), we have $$p(Y_m) = \prod_{k=0}^{N/2} |G[k]|^2 p(X_m), \tag{18}$$

except for k=0, N/2 where, since $X_m[k]$, $Y_m[k]$ are real, we must use | G[k] | instead of its square. Next, we assume the sources are mutually independent, hence $$p(X_m) = \sum_{i=1}^{L} p(X_{im}) \tag{19}$$

where $p(X_{im})$ is given by (6,7). The sensor likelihood is therefore given by $$L(G) = \sum_{m=0}^{M-1} \log p(Y_m) = M\sum_{k=0}^{N/2} \log|G[k]|^2 + \sum_{m=0}^{M-1}\sum_{i=1}^{L} \log p(X_{im}) \tag{20}$$

where $X_m[k]=G[k]Y_m[k]$. Inferring the unmixing transformation is done by maximizing this likelihood w.r.t. G.

An Algorithm for Inferring the Unmixing Transformation from Data

Like the source signals, the sensor signals are also described by a hidden variable model, since the states $S_{im}$ are unobserved. Hence, to infer G we must use an EM algorithm. To derive it we consider the objective function $$F(\tilde{\pi}_{1:L}, G) = M\sum_{k=0}^{N/2} \log|G[k]|^2 + \sum_{i=1}^{L} F_i(\tilde{\pi}_i, \theta_i, G) \tag{21}$$

where $F_i$ is given by (9); we have added G as an argument since $F_i$ depends on G via $X_i$. Each EM iteration maximizes F alternately w.r.t. the unmixing G and the posteriors $\overline{\pi}_i$, where $\pi_{ism}$ is the probability that source i is in state $S_{im}$=at time m, as before, except now this probability is conditioned on the sensor frame $Y_m$. The dictionaries $\theta_{1:L}$ are held fixed. The E-step maximizes F w.r.t. the state posteriors by the update rule $$\tilde{\pi}_{ism} = p(S_{im} = s \mid X_{im}) = \frac{p(X_{im}, S_{im} = s)}{\sum_{s'=1:S} p(X_{im}, S_{im} = s')}, \tag{22}$$

keeping constant the current values of G. Note that this rule is formally identical to (22), except now the $X_{im}$ are given by $X_m[k]=G[k]Y_m[k]$.

The M-step maximizes F w.r.t. the unmixing transformation G. Before presenting the update rule, we rewrite F as follows. Let $C^i[k]$ denote the ith weighted correlation of the sensor frames at frequency k. It is a Hermitian L×L matrix defined by $$C^i_{jj'}[k] = \frac{1}{M}\sum_{m=0}^{M-1} \tilde{v}_{im}[k] Y_{jm}[k] Y^*_{j'm}[k] \tag{23}$$

where the weight for $C^i$ is given by the precisions of source i's states, averaged w.r.t. their posterior, $$\tilde{v}_{im}[k] = \sum_{s=1}^{S_i} \tilde{\pi}_{ism} v_{is}[k]. \tag{24}$$

F of (21) is now given by $$F(\tilde{\pi}_{1:L}, G) = M\log|G[k]|^2 - M\sum_{i=1}^{L} (G[k]C^i[k]G[k]^\dagger)_{ii} + f \tag{25}$$

where f is the G-independent part of F, $$f = \sum_{m=0}^{M-1}\sum_{i=1}^{L}\sum_{s=1}^{S_i} \tilde{\pi}_{ism}\left[\sum_{k=0}^{N/2} \log\frac{v_{is}[k]}{\pi} + \log\pi_{is} - \log\tilde{\pi}_{ism}\right]. \tag{26}$$

The form (25) shows that G[k] is identifiable only within a phase factor, since the transformation $G[k] \rightarrow \exp(i\phi_k)G[k]$ leaves F unchanged. Hence, F is maximized by a one-dimensional manifold rather than a single point.

Finding this manifold can generally be done efficiently by an iterative method, based on the concept of the relative (a.k.a. natural) gradient. Consider the ordinary gradient $$\frac{\partial F}{\partial G_{ij}[k]} = 2(G[k]^{\dagger -1} - G[k]C^i[k])_{ij}. \tag{27}$$

To maximize F, we increment G[k] by an amount proportional to $(\partial F/\partial G[k])G[k]^\dagger G[k]$. Using (27) we obtain $$G_{ij}[k] \rightarrow G_{ij}[k] + \epsilon(G[k] - G[k]C^i[k]G[k]^\dagger G[k])_{ij} \tag{28}$$

where ∊ is the adaptation rate. Convergence is achieved when F no longer increases. Standard numerical methods for adapting the step size (i.e., ∊) can be applied to accelerate convergence.

Hence, the result of the M-step is the unmixing transformation G obtained by iterating (28) to convergence. Alternatively, one may stop short of convergence and move on to the E-step of the next iteration, as this would still result in increasing F.

Initial values for the unmixing G[k], required to start the EM iteration, are obtained by considering F of (25) and replacing the matrices $C^i$ by the unweighted sensor correlation matrix $$C[k] = \frac{1}{M}\sum_{m=0}^{M-1} Y_m[k]Y_m[k]^{\dagger}. \tag{29}$$

We then set $G[k]=D[k]^{-1/2}P[k]^{\dagger}$, where P[k], D[k] are the eigenvectors and eigenvalues, respectively, of C[k], obtained, e.g., by singular value decomposition (SVD). It is easy to show that this value maximizes the resulting F.

M-step for Two Sensors

The special case of L=2 sensors is by far the most common one in practical applications. Incidentally, in this case there exists an M-step solution for G which is even more efficient than the iterative procedure of (28). This is because the M-step maximization of F (25) for L=2 can be performed analytically. This section describes the solution.

At a maximum of F the gradient (27) vanishes, hence the G we seek satisfies $(G[k]C^i[k]G[k]^{\dagger})_{ij}=\delta_{ij}$.

Let us write the matrix G[k] as a product of a diagonal matrix U[k] and a matrix V[k] with ones on its diagonal, $$G[k] = U[k]V[k] \tag{30}$$

$$U[k] = \begin{pmatrix} u_1[k] & 0 \\ 0 & u_2[k] \end{pmatrix},$$

$$V[k] = \begin{pmatrix} 1 & v_1[k] \\ v_2[k] & 1 \end{pmatrix}.$$

With these definitions, the zero gradient condition leads to the equations $$(V[k]C^i[k]V[k]^{\dagger})_{i\neq j}=0$$

$$|u_i[k]|^2(V[k]C^i[k]V[k]^{\dagger})_{ii}=1. \tag{31}$$

We now turn to the case L=2, where all matrices are 2×2. The first line in (31) then implies that $v_1$ depends linearly on $v_2$ and $v_2$ satisfies the quadratic equation $av_2^2+bv_2+c=0$. Hence, we obtain $$v_1 = \frac{(av_2+d)^*}{c} \tag{32}$$

$$v_2 = \frac{-b \pm \sqrt{b^2-4ac}}{2a},$$

where the frequency dependence is omitted. The second line in (31) identifies the $u_i$ within a phase, reflecting the identifiability properties of G. Constraining them to be real nonnegative, we obtain $$u_1=(\alpha_1+2Re\beta_1^*v_1+\gamma_1|v_1|^2)^{-1/2}$$

$$u_2=(\gamma_2+2Re,\beta_2v_2+\alpha_2|v_2|^2)^{-1/2}. \tag{33}$$

The quantities $\alpha_i[k],\beta_i[k],\gamma_i[k]$ denote the elements of the weighted correlation matrices (23) for each frequency k, $$C^i[k] = \begin{pmatrix} \alpha_i[k] & \beta_i[k] \\ \beta_i^*[k] & \gamma_i[k] \end{pmatrix},\quad i=1,2 \tag{34}$$

where αhd i[k],$\gamma_i$([k] are real nonnegative and $\beta_i[k]$ is complex. The coefficients a[k], b[k], c[k], d[k] are given by $$a=\alpha_1\beta_2-\alpha_2\beta_1$$

$$b=\alpha_1\gamma_2-\alpha_2\gamma_1+d$$

$$c=\beta_1^*\gamma_2-\beta_2^*\gamma_1$$

$$d=2i\mathrm{Im}\beta_1^*\beta_2. \tag{35}$$

Hence, the result of the M-step for the case L=2 is the unmixing transformation G of (30), obtained using Eqs. (23, 24,32-35).

FIG. 4 shows a summary of the algorithm for inferring the sieve parameters from sensor data and producing Audiosieve's output channels. It begins by initializing G[k] using SVD as described around Eq. (29). Next comes the EM iteration, where the E-step updates the state posteriors $\overline{\pi}_{ism}$ for each source using (22), and the M-step updates the sieve parameters G[k] using Eq. (28) if L>2 and using Eqs. (30,32-35) if L=2. The iteration terminates when a convergence criterion is satisfied. The algorithm then applies the sieve to the sensor data using (3) and produces the output channels.

Audio Skins

There is often a need to modify the mean spectrum of a sound playing in an Audiosieve output channel into a desired form. Such a desired spectrum is termed skin. Assume we have a directory of skins obtained, e.g., from the spectra of signals of interest. Let $\Psi_i[k]$ denote a desired skin from that directory, which the user wishes to apply to channel i. To achieve this, we transform the frames of source i by $$X_{im}[k] = \rightarrow \left(\frac{\psi_i[k]}{\sum_{m'=0}^{M-1}|X_{im'}|^2}\right)^{1/2} X_{im}[k]. \tag{36}$$

This transformation is applied after inferring the frames $X_{im}$ and before synthesizing the audible waveform $x_{in}$.

Extensions

The framework for selective signal cancellation described in this example can be extended in several ways. First, the audio dictionary presented here is based on modeling the source signals by a mixture distribution with Gaussian components. This model also assumes that different frames are statistically independent. One can generalize this model in many ways, including the use of non-Gaussian component distributions and the incorporation of temporal correlations among frames. One can also group the frequencies into multiple bands, and use a separate mixture model within each band. Such extensions could result in a more accurate source model and, in turn, enhance Audiosieve's performance.

Second, this example presents an algorithm for inferring the audio dictionary of a particular sound using clean data samples of that sound. This must be done prior to applying Audiosieve to a particular selective signal cancellation task. However, that algorithm can be extended to infer audio dictionaries from the sensor data, which contain overlapping sounds from different sources. The resulting algorithm would then become part of the sieve inference engine. Hence, Audiosieve would be performing dictionary inference and selective signal cancellation in an integrated manner.

Third, the example presented here requires the user to select the audio dictionaries to be used by the sieve inference engine. In fact, Audiosieve can be extended to make this selection automatically. This can be done as follows. Given the sensor data, compute the posterior probability for each dictionary stored in the library, i.e., the probability that the data has been generated by sources modeled by that dictionary. The dictionaries with the highest posterior would then be automatically selected.

Fourth, as discussed above, the sieve inference engine presented in this example assumed that the number of sources equals the number of sensors and that the background noise vanishes, and would perform suboptimally under conditions that do not match those assumptions. It is possible, however, to extend the algorithm to perform optimally under general conditions, where both assumptions do not hold. The extended algorithm would be somewhat more expensive computationally, but would certainly be practical.

Fifth, the sieve inference algorithm described in this example performs batch processing, meaning that it waits until all sensor data are captured, and then processes the whole batch of data. The algorithm can be extended to perform sequential processing, where data are processed in small batches as they arrive. Let t index the batch of data, and let $Y_m^t[k]$ denote frame m of batch t. We then replace the weighted sensor correlation matrix $C^i[k]$ (23) by a sequential version, denoted by $C^{it}[k]$. The sequential correlation matrix is defined recursively as a sum of its value at the previous batch $C^{i,t-1}[k]$, and the matrix computed from the current batch $Y_t^m[k]$, $$C^{it}_{jj'}[k] = \eta \frac{1}{M} \sum_{m=0}^{M-1} \bar{v}^t_{im}[k] Y^t_{jm}[k] Y^{t*}_{j'm}[k] + \eta' C^{i,t-1}_{jj'}[k] \quad (37)$$

where η, η' defined the relative weight of each term and are fixed by the user; typical values are η=η'=0.5. We replace $C^i[k] \rightarrow C^{it}[k]$ in Eqs. (28,34).

FIG. 5 shows the resulting sieve inference algorithm, which proceeds as follows. It begins by initializing G[k] using SVD as described around Eq. (29), using an appropriate number of the first batches of sensor data. Next, for each new batch t of data we perform an EM iteration, where the E-step updates the state posteriors $\bar{\pi}_{ism}$ for each source using (22), and the M-step updates the sieve parameters G[k] using Eq. (28) if L>2 and using Eqs. (30,32-35) if L=2. In either case, the M-step is modified to use $C^{it}$ rather than $C^i$ as discussed above. The updated sieve is applied to the current data batch to produced the corresponding batch of output signals, $X_m^t[k]=G[k]Y_m^t[k]$, which are sent to Audiosieve's output channels. The algorithm terminates after the last batch of data has arrived and been processed.

Sequential processing is more flexible and requires less memory and computing power. Moreover, it can handle more effectively dynamic cases, such as moving sound sources, by tracking the mixing as it changes and adapt the sieve appropriately. The current implementation of Audiosieve is in fact sequential.

The invention claimed is:

1. A method for separating signals from multiple audio sources, the method comprising:

a) emitting L source signals from L audio sources disposed in a common acoustic environment, wherein L is an integer greater than one;

b) disposing L audio detectors in the common acoustic environment;

c) receiving L sensor signals at the L audio detectors, wherein each sensor signal is a convolutive mixture of the L source signals;

d) providing D≧L frequency-domain probabilistic source models, wherein each source model comprises a sum of one or more source model components, and wherein each source model component comprises a prior probability and a probability distribution having one or more frequency components, whereby the D probabilistic source models form a set of D audio dictionaries;

e) selecting L of the audio dictionaries to provide a one-to-one correspondence between the L selected audio dictionaries and the L audio sources;

f) inferring an unmixing and deconvolutive transformation G from the L sensor signals and the L selected audio dictionaries by maximizing a likelihood of observing the L sensor signals;

g) recovering one or more frequency-domain source signal estimates by applying the inferred unmixing transformation G to the L sensor signals;

h) recovering one or more time-domain source signal estimates from the frequency-domain source signal estimates.

2. The method of claim 1, wherein each member of said set of D audio dictionaries is provided by:

receiving training data from an audio source;

selecting said prior probabilities and parameters of said probability distributions to maximize a likelihood of observing the training data.

3. The method of claim 1, wherein said inferring an unmixing and deconvolutive transformation is performed as a batch mode calculation based on processing the entire duration of said sensor signals.

4. The method of claim 1, wherein said inferring an unmixing and deconvolutive transformation is performed as a sequential calculation based on incrementally processing said sensor signals as they are received.

5. The method of claim 1, wherein said selecting L of the audio dictionaries comprises user selection of said audio dictionaries to correspond with said audio sources.

6. The method of claim 1, wherein said L selected audio dictionaries are predetermined inputs for said maximizing a likelihood of observing the L sensor signals.

7. The method of claim 1, wherein said selecting L of the audio dictionaries comprises automatic selection of said audio dictionaries to correspond with said audio sources.

8. The method of claim 7, wherein said automatic selection comprises selecting audio dictionaries to maximize a likelihood of observing the L sensor signals.

9. The method of claim 1, further comprising filtering one or more of said frequency domain source signal estimates prior to said recovering one or more time-domain source signal estimates.

10. The method of claim 1, wherein said component probability distribution comprises a product of single-variable probability distributions in one-to-one correspondence with said frequency components, wherein each single-variable probability distribution has the same functional form.

11. The method of claim 10, wherein said functional form is selected from the group consisting of Gaussian distributions, and non-Gaussian distributions constructed from an initial Gaussian distribution by modeling a parameter of the initial Gaussian distribution as a random variable.

12. A system for separating signals from multiple audio sources, the system comprising:

a) L audio detectors disposed in a common acoustic environment also including L audio sources, wherein L is an integer greater than one, and wherein each audio detector provides a sensor signal;

b) a library of $D \geqq L$ frequency-domain probabilistic source models, wherein each source model comprises a sum of one or more source model components, and wherein each source model component comprises a prior probability and a component probability distribution having one or more frequency components, whereby the library of D probabilistic source models form a library of D audio dictionaries;

c) a processor receiving the L sensor signals, wherein i) L audio dictionaries from the library are selected to provide a one-to-one correspondence between the L selected audio dictionaries and the L audio sources, ii) an unmixing and deconvolutive transformation G is inferred from the L sensor signals and the L selected audio dictionaries by maximizing a likelihood of observing the L sensor signals, iii) one or more frequency-domain source signal estimates are recovered by applying the inferred unmixing transformation G to the L sensor signals;

iv) one or more time-domain source signal estimates are recovered from the frequency-domain source signal estimates.

* * * * *